US009225949B2

(12) United States Patent
Kimpe

(10) Patent No.: US 9,225,949 B2
(45) Date of Patent: Dec. 29, 2015

(54) SENSORY UNIT FOR A 3-DIMENSIONAL DISPLAY

(75) Inventor: Tom Kimpe, Gent (BE)

(73) Assignee: BARCO, N.V., Kortrijk (BE)

( * ) Notice: Subject to any disclaimer, the term of this patent is extended or adjusted under 35 U.S.C. 154(b) by 779 days.

(21) Appl. No.: 12/276,054

(22) Filed: Nov. 21, 2008

(65) Prior Publication Data

US 2009/0141022 A1 Jun. 4, 2009

(30) Foreign Application Priority Data

Nov. 24, 2007 (EP) .................................... 07121470

(51) Int. Cl.
*G06T 15/00* (2011.01)
*G09G 5/00* (2006.01)
*H04N 9/07* (2006.01)
*H04N 13/04* (2006.01)

(52) U.S. Cl.
CPC ............. *H04N 9/07* (2013.01); *H04N 13/0422* (2013.01); *H04N 13/0425* (2013.01)

(58) Field of Classification Search
CPC .......... H04N 13/0025; H04N 13/0402; H04N 13/0434; H04N 9/07; H04N 13/0422; G09G 2360/14; G09G 5/00; G06T 15/00
USPC ........................ 345/207, 419, 214; 348/42, 51
See application file for complete search history.

(56) References Cited

U.S. PATENT DOCUMENTS

| 5,481,321 | A * | 1/1996 | Lipton .............................. 352/57 |
| 5,850,352 | A * | 12/1998 | Moezzi et al. ................. 345/419 |
| 5,898,520 | A * | 4/1999 | Curatu ........................... 359/465 |
| 6,483,948 | B1 * | 11/2002 | Spink et al. .................... 382/255 |
| 6,768,509 | B1 * | 7/2004 | Bradski et al. ........... 348/207.99 |
| 2002/0154215 | A1 * | 10/2002 | Schechterman et al. ........ 348/51 |
| 2004/0027451 | A1 * | 2/2004 | Baker .............................. 348/46 |
| 2006/0087734 | A1 * | 4/2006 | Weissman ...................... 359/462 |
| 2006/0268104 | A1 * | 11/2006 | Cowan et al. .................... 348/42 |
| 2007/0055143 | A1 * | 3/2007 | Deroo et al. .................. 600/425 |
| 2007/0098236 | A1 * | 5/2007 | Maack ........................... 382/128 |
| 2007/0188602 | A1 * | 8/2007 | Cowan et al. .................... 348/53 |
| 2008/0075324 | A1 * | 3/2008 | Sato et al. ...................... 382/106 |
| 2008/0136900 | A1 * | 6/2008 | Grasnick ......................... 348/51 |
| 2008/0309884 | A1 * | 12/2008 | O'Dor et al. ...................... 353/7 |
| 2009/0119010 | A1 * | 5/2009 | Moravec ....................... 701/209 |

(Continued)

FOREIGN PATENT DOCUMENTS

WO WO 2006/021283 A1 3/2006
WO 2006/128066 A2 11/2006

(Continued)

OTHER PUBLICATIONS

Search Report of European Patent Office regarding European Patent Application No. EP 07121470 4-1241, Nov. 11, 2008.

(Continued)

*Primary Examiner* — Kimbinh T Nguyen
(74) *Attorney, Agent, or Firm* — Bacon & Thomas, PLLC

(57) ABSTRACT

The invention relates to a sensor unit for a display system adapted for generating three dimensional images by combining at least first sub-images for a first eye and second sub-images for a second eye. The sensor unit includes a detector and is adapted to individually detect irradiation properties of the radiation used for the displaying of said first sub-images and/or of the radiation used for the displaying of said second sub-images.

25 Claims, 5 Drawing Sheets

(56) References Cited

U.S. PATENT DOCUMENTS

2009/0153652 A1* 6/2009 Barenbrug ..................... 348/54
2014/0168206 A1* 6/2014 Barenbrug .................... 345/419

FOREIGN PATENT DOCUMENTS

WO  WO 2006/116536  A1  11/2006
WO  WO 2007/059965  A1  5/2007

OTHER PUBLICATIONS

Examination Report of EPO regarding European Patent Application No. 07 121 470.4, Nov. 26, 2010.
Search Report dated Feb. 17, 2015 issued in corresponding European application No. 07 121 470.4.

* cited by examiner

SENSORY UNIT FOR A 3-DIMENSIONAL DISPLAY

TECHNICAL FIELD OF THE INVENTION

The present invention relates to 3 dimensional display systems. More particularly, the present invention relates to methods and systems for controlling, optimising and/or driving 3 dimensional display systems, e.g. stereoscopic display systems or holographic display systems.

BACKGROUND OF THE INVENTION

In order to guarantee the required display properties, 2-dimensional display systems are frequently controlled, adjusted and/or calibrated with respect to their display properties and parameters. Such adjustment of the display properties of a 2-dimensional display system are often carried out at the beginning of a phase of use of the display. Improved versions provide adjustment of display properties and parameters of the display system in real is time. The control, adjustment and/or calibration is often based on the sensor output of a sensor determining the display properties at start-up or during operation.

For regular "2D-displays" the medical imaging community heavily makes use of display calibration (DICOM GSDF calibration) to make sure that the most subtle features are visible and that image quality is sufficient over the entire lifetime of the display. The latter is required for medical displays in order to be sufficiently reliable to be used in situations where important medical decisions are to be made.

It is clear that also for 3D displays similar calibration technology will be necessary. Traditional 2D calibration methods are not useful in the 3D case because of the completely different way of forming the image. Furthermore, the use of 3-dimensional displaying in critical applications such as medical imaging, sets high requirements on the imaging quality. It is a challenge to obtain a sufficient image quality such that three dimensional imaging techniques such as for example stereoscopic or holographic displays can be used in life critical applications and for primary diagnosis.

SUMMARY OF THE INVENTION

It is an object of the present invention to provide good apparatus or methods for detecting display properties of three dimensional imaging systems. It is an advantage of embodiments according to the present invention that these can be applied or used for calibrating, maintaining, optimizing or controlling three-dimensional display or image systems. The above objective is accomplished by a method and device according to the present invention.

The present invention relates to a sensor unit for sensing imaging properties of a display system adapted for generating three dimensional images by combining at least first sub-images for a first eye and second sub-images for a second eye, the sensor unit comprising a detector and being adapted for detecting a signal comprising information related to separate properties of the radiation used for the displaying of said first sub-images and/or separate properties of the radiation used for the displaying of said second sub-images individually. The display system may be any of a stereoscopic or holographic display system. It is an advantage of embodiments according to the present invention that proper calibration of the display system for generating three dimensional images can be obtained. It is an advantage of embodiments according to the present invention that high quality imaging can be obtained by the display system. It is an advantage of embodiments of the present invention that display properties quality of the display system can be stabilised or controlled over time.

The sensor unit may be adapted for detecting separately a signal comprising information related to separate properties of the radiation used for the displaying of said first sub-images and/or detecting separately a signal comprising information related to separate properties of the radiation used for the displaying of said second sub-images.

The sensor unit may comprise a filter for filtering radiation used for displaying of said first sub-images from radiation used for the displaying of said second sub-images.

The filter may be adapted for filtering radiation used for the displaying of said second sub-images from radiation used for the displaying of said first sub-images. It is an advantage of embodiments according to the present invention that the sensor unit can measure display characteristics for displaying at least first sub-images and display characteristics for displaying at least second sub-images independent of each other. Alternatively, display characteristics of the second imaging may be determined from display characteristics measured for the 3D-images.

The filter may be a temporal filter adapted for altering the detected radiation by alternatingly providing different filter portions with a different filter characteristic in a light path to a detector of the sensor unit. It is an advantage of embodiments according to the present invention that sensory systems are provided that can be used for time sequential 3 dimensional imaging systems.

The sensor unit may comprise a shutter for generating said temporal filter.

The sensor unit may comprise a detector, the detector having a first detector part and a second detector part and wherein the filter comprises a spatial filter being adapted for spatially filtering radiation for the displaying of said first sub-images substantially only to said first detector part. It is an advantage of embodiments according to the present invention that sensor systems are provided that can be used for 3D displays based on time sequential, directional and/or spatially distinct imaging techniques for imaging the sub-images to different eyes.

The filter may be based on filtering radiation having a first color and/or first polarisation state and/or first emission angle range to a first detector part only and filtering light having a second color and/or second polarisation and/or second emission angle range to a second detector part only. It is an advantage of embodiments according to the present invention that sensor systems are provided that can use the same technology for separating the sub-images as used in the display system.

The filter may comprise a polariser or liquid crystal display for selecting radiation with a predetermined polarisation state, a spectral filter for selecting radiation with a predetermined wavelength or within a predetermined wavelength range or a barrier or Fourier lens for selecting light emitted under predetermined emission angles or predetermined emission angle ranges.

The sensor unit may comprise a radiation guide for guiding light to the detector. It is an advantage of embodiments according to the present invention that sensor systems may be provided that do not need to be completely positioned in front of the display system. The latter may e.g. decrease the amount of the screen that is blocked when the sensor is installed, which may be especially suitable when the sensor unit is installed also during normal use of the display system. The light guide may be optical fibres, although the invention is not limited thereto and also other types of waveguides may be used. It is furthermore an advantage of embodiments according to the present invention that the amount of stray light or environmental light, not stemming from emission by the display, can be limited.

The filter may be provided in said radiation guide. It is an advantage of embodiments according to the present invention that the sensor systems may be compact. The sensor unit may comprise a first sensor device for detecting is radiation properties of the displaying of the first sub-images and a second sensor device for detecting radiation properties of the displaying of the second sub-images separately, whereby the first sensor device and the second sensor device may be physically split.

The sensor unit may comprise a driver for driving said sensor unit such as to obtain a plurality of sampled read-outs being representative of only radiation for the displaying of first sub-images or only radiation for the displaying of second sub-images. It is an advantage of embodiments according to the present invention that a standard detector can be used in combination with a driver providing appropriate sampling so as to sample in agreement with individual sub-images displayed by the display system.

The sensor unit may comprise a synchronizer for synchronising said driver with driving of said display system.

The sensor unit may be adapted for determining one of cross-talk, angular emission patterns, modulation transfer functions, flicker or a display property of the displaying of first sub-images or second sub-images individually.

The sensor unit may be adapted for determining one of cross-talk, angular emission patterns, modulation transfer functions, flicker or a display property of the displaying of first sub-images or second sub-images individually in real time. It is an advantage of embodiments according to the present invention that the sensor unit can be used for adaptation of the display system during operation.

The sensor unit may be adapted for determining a luminance and/or color point of the displaying of first sub-images or the displaying of second sub-images individually.

The determining may be performed in real time.

The sensor unit furthermore may be adapted for being coupled to a processor for deriving, from said at least one signal, separate radiation properties of the displaying of said first sub-images and/or separate radiation properties of the displaying of said second sub-images.

The sensor unit furthermore may comprise a processor for processing detected signals comprising information related to radiation used for displaying said first sub-images thus deriving said display properties for the displaying of first sub-images and/or for processing detected radiation signals of radiation used for displaying said second sub-images thus deriving said display properties for the displaying of first sub-images.

The processor may be adapted for applying a human visual model using said individual display properties for displaying said first sub-images and said individual display properties for displaying said second sub-images as input.

The processor may be adapted for processing said individual display properties for displaying said first sub-images as function of said individual display properties for displaying said second sub-images.

The process may be adapted for determining calibration information for said display system based on said processing.

The processor may be adapted for determining said calibration information in agreement with a predetermined standard.

The predetermined standard may be the DICOM GSDF standard.

The derived radiation properties of the displaying may comprise any of a brightness, a spectrum, an average color point, an average emission angle, a maximum luminance, an average luminance, a minimum luminance, a contrast ratio, an average contrast ratio, a response time between specific greyscale transitions or an average response time.

The present invention also relates to a display system for generating three-dimensional images, the display system comprising a sensor unit as described above.

The present invention furthermore relates to a method for deriving display properties of a display system for generating three-dimensional images by combining at least first sub-images for a first eye and second sub-images for a second eye, the method comprising detecting at least one signal comprising information related to separate properties of the radiation used for the displaying of said first sub-images and to separate properties of the radiation properties of the radiation used for the displaying of said second sub-images individually and deriving individual display properties for the displaying of first sub-images and second sub-images based on the detected separate radiation properties.

The present invention also relates to a method for calibrating or controlling a display system for generating three-dimensional images by combining at least first sub-images for a first eye and second sub-images for a second eye, the method comprising obtaining display properties of a display system using a method for deriving display properties of a display system for generating three-dimensional images by combining at least first sub-images for a first eye and second sub-images for a second eye as described above, the method for calibrating or controlling further comprising using said detected display properties for adjusting or controlling the displaying of the first sub-image and the displaying of the second sub-image.

The present invention furthermore relates to a controller for use with a sensory unit for a display system adapted for generating three dimensional images by combining at least first sub-images for a first eye and second sub-images for a second eye, the controller being adapted for generating control signals for driving said sensor unit in synchronisation with the display system, such as to obtain a plurality of sampled read-outs being representative of radiation properties of the radiation used for the displaying of separate properties of the radiation used for the displaying of said first sub-images and/or separate properties of the radiation used for the displaying of said second sub-images individually.

Particular and preferred aspects of the invention are set out in the accompanying independent and dependent claims. Features from the dependent claims may be combined with features of the independent claims and with features of other dependent claims as appropriate and not merely as explicitly set out in the claims. The teachings of the present invention permit the design of improved methods and apparatus for displaying appropriate three dimensional images.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
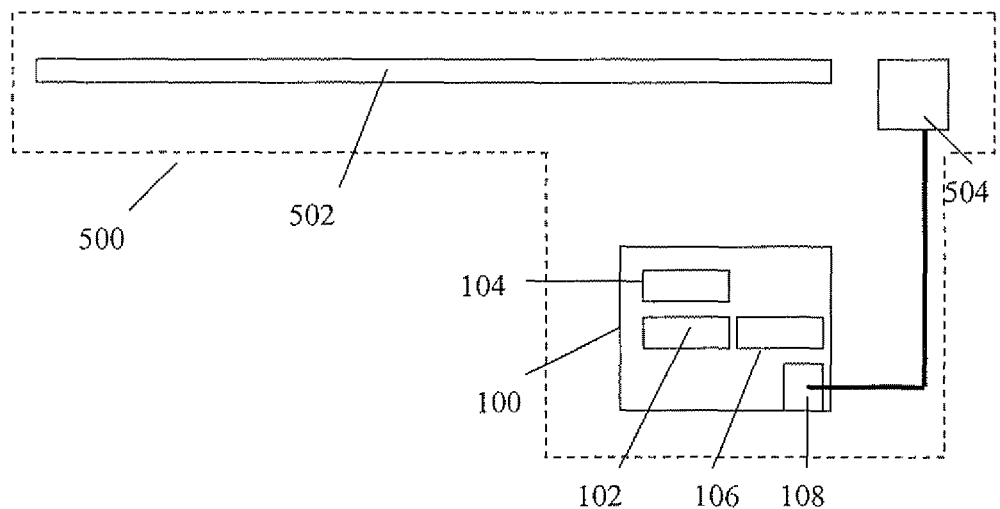
FIG. 1 is a schematic representation of a sensor unit in a display system according to embodiments of a first aspect of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention. Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Furthermore, the particular features, structures or characteristics may be combined in any suitable manner, as would be apparent to one of ordinary skill in the art from this disclosure, in one or more embodiments. While some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination. Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

The following terms are provided solely to aid in the understanding of the invention. With three dimensional imaging or three dimensional display system there is meant any technique capable of obtaining, generating or providing three-dimensional visual information or generating the illusion of depth in an image. The latter may be performed by presenting a slightly different image to each eye. Examples of techniques that may be used are stereoscopic imaging techniques or holographic techniques. Stereoscopic as well as holographic imaging may be performed in black and white images, grey-scale images and colour images.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

The present invention relates to a sensor unit for a display system adapted for generating three dimensional images, such as e.g. still images, moving images or video content. The sensor unit may be for example for use in a stereoscopic or holographic display system. The sensor unit can be used for any display system generating three dimensional images by combining at least first sub-images for a first eye and second sub-images for a second eye. Additional sub-images intended for both eyes also may be used. Furthermore, the system may be a two-view system, although the invention is not limited thereto. The invention also relates to multi-view display systems where there is more than a first, e.g. one left, and a second, e.g. one right, image. For example a 6 view stereo display system will have 3 pairs of left and right images. Advantage is that if the user walks around the display that then also the perception of the object will change, if different image information is generated for the two other L/R pairs. The systems and methods thus may be adapted for adjusting sub-images for two or more "eyes", e.g. views, of the display system. The system may also be a holographic display system where there is no discrete number of views anymore but where continuous wave fronts are generated. It furthermore is to be noticed that different driving schemes and/or different imaging techniques as e.g. described below, may be used for different views. The sensor unit according to embodiments of the present invention comprises a detector and is adapted for detecting radiation properties of the radiation used for the displaying of at least first sub-images, e.g. intended for the left eye, individually and/or separately from radiation properties of the radiation used for the displaying of second sub-images, e.g. intended for the right eye. The sensor unit thus is adapted for detecting a signal comprising information related to separate properties of the radiation used by the display system for the displaying of the first sub-images and/or separate properties of the display system for the displaying of the second sub-images individually. The latter may be performed by detecting individually at least part of the radiation used for displaying the different sub-images by the display system. Such individually detected signal comprising information may be representative of a display property such as for example brightness, a spectrum of the emission wavelengths emitted, an average color point, an average emission angle or direction, a range of emission angles or emission directions, a maximum luminance, an average luminance, a minimum luminance, a contrast ratio, an average contrast ratio, a response time between specific greyscale transitions, an average response time, etc. More generally, it may be representative of any display parameter or property of the displaying of the first sub-images and/or of the displaying of the second sub-images. The sensor unit may be adapted for deriving such a display property from the detected radiation property. In some examples, the detector may be an intensity detector adapted for detecting the incident light intensity. The detector may be a combination of individual detectors. The one or more sensors may be positioned at the front side of the display. Alternatively or in addition thereto the sensor or sensors may be provided with a waveguide to transport the light to the sensors, so that the sensor or sensors can be positioned outside the viewing field of the display. The detector also may be a line or array detector. In advantageous embodiments, the detector comprises at least a plurality of different detector pixels for detecting different signals. Alternatively, e.g. if a single detection cell is used, or in addition thereto, time sequential detection could be performed. The detector may e.g. be a photodetector, such as for example a photodiode or any other suitable detector.

The detection of the signal comprising information related to the radiation properties may be performed for the displaying of a single type of sub-images, for the displaying of a couple of types of sub-images, or for the displaying of all types of sub-images generated in the display system. For example if two types of sub-images are used, e.g. one type for the left eye and one type for the right eye of a viewer, the detection may be performed for the displaying of the first type of sub-images individually, whereas the radiation properties of the radiation for displaying of the second type of sub-images may be determined from the detected radiation for the displaying of the first type of sub-images and e.g. the display properties measured for the overall imaging of the display system. Alternatively the signal comprising information related to radiation properties of the radiation for displaying of the first type of sub-images and the radiation properties of the radiation used for displaying of the second type of sub-images may be individually detected.

The individual or separate detection of the signal comprising information related to the radiation properties of the radiation for displaying the different sub-images may be performed using a filter, filtering radiation used for the displaying of first sub-images from radiation used for the displaying of the second sub-images. The filter may be a spatial filter, e.g. adapted for making a spatial distinction between radiation corresponding with the different sub-images, such that radiation emitted for displaying different sub-images is spatially distinguished. The latter may be especially suitable in case the different sub-images are produced simultaneously but based on different properties of the radiation used for displaying them. Alternatively or in addition thereto the filter may be a temporal filter, e.g. adapted for detecting different sub-images temporally distinct, such as e.g. in a time sequential display system. The display system may be adapted for operating independent of the timing of the display system, thus not requiring a communication between the sensor unit and the display system.

In particular embodiments, the sensor unit furthermore comprises a processor for processing the detected signal. The processor may be part of the sensor unit or the sensor unit may be coupled to it whereby the processor is external to the sensor unit. Such an external processor may e.g. be implemented on a PC or host computer. The processor may e.g. be adapted for deriving display properties of the displaying of the different types of sub-images separately from the measured radiation. The sensor unit may generate control signals comprising control, adjustment or calibration information for the display system in agreement with the derived display properties. It may be adapted for applying a human visual model using the individual detected radiation properties or derived display properties for the displaying of different sub-images as input. The model thereby may process the detected signal by combining the different individual radiation or display properties whereby the information derived from a first individual display property for a first type of sub-images is used for processing the individual property for the displaying of second type of sub-images. In other words, the processing of the individually radiation or display properties may comprise processing the signal comprising information related to the first individual properties as function of the second individual properties. The processor may be adapted for generating calibration, adjustment or control information. Such information may comprise adjustment settings for the displaying of first sub-images, adjustment settings for the displaying of second sub-images, adjustment settings for the displaying in general, thus applicable to the displaying of both types of sub-images, etc. The processor furthermore may be adapted for deriving calibration, adjustment or control information for the displaying to be in agreement with a predetermined standard. Such a standard may for example be a DICOM GSDF standard, an ICC colour profile, or any other suitable standard that may be used.

The sensor unit furthermore may comprise an output for outputting such control signals. In some embodiments, these control signals may be provided directly to the driver of the display system, thus allowing automatic control, adjustment, calibration or correction of the display system.

The sensor unit advantageously uses the same radiation property for filtering the different images as the radiation property used by the display system for providing first sub-images to a first eye and providing second sub-images to a second eye separately. For example, for three dimensional displaying systems providing sub-images that are provided spatially distinctive to the different eyes or views, such as e.g. in helmet mounted devices, virtual reality headsets or autostereoscopic display systems, the sensor unit may collect the image using a spatial filter for the radiation such as for example using a barrier, using filtering as function of a angle or range of angles of emission, etc. For three dimensional displaying systems based on time sequential provision of sub-images to the eyes, the sensor unit may collect radiation used for displaying the sub-images using a temporal filter, e.g. following the time sequential provision of the sub-images by the display system. For three dimensional displaying systems providing sub-images to the different eyes based on particular properties of the radiation used for imaging, the sensor unit may collect the sub-images using a filter for the same particular radiation properties used, such as e.g. a color spectral filter, a polarisation filter, etc.

The sensor unit may be used in real time, thus allowing to control, adjust, calibrate or correct the display system during its use. The sensor unit also may be adapted for use at predetermined calibration moments, e.g. at start-up of the system. The sensor unit may be adapted for determining any of cross-talk, angular emission patterns, modulation transfer functions, noise levels, noise power spectrum, flicker, a display property of the individual displaying of sub-images, etc.

By way of example, the present invention not being limited thereto, a schematic representation of the display system is shown in FIG. 1, showing standard and optional components of the sensor unit 100. The sensor unit 100 is shown with detector 102, an optional filter 104, an optional processor 106, and an optional output 108 for outputting control signals to a display system 500. The display system 500, which may be separate from the sensor unit 100 or from which the sensor unit 100 may be part, may comprise a display screen 502 and a driver 504 or driving unit for controlling the display screen. The driver 504 may provide driving information to the sensor unit 100. The driver 504 may be adapted for receiving control signals from the sensor unit 100 for controlling, adjusting or calibrating display properties. The sensor unit furthermore may be adapted for providing test signals to the display system 500 for generating test sub-images on the display system 500.

In the following embodiments and examples, the number of different types of sub-images filtered may correspond with the number of different types of sub-images generated for the different eyes or views. For ease of explanation, the present examples are illustrated using two filters for filtering two types of sub-images, although the invention is not limited thereto. When more sub-images need to be selected separately, more particular filters can be used.

Further particular examples and embodiments will be illustrated by way of example with reference to FIG. 2 to FIG. 8, the present invention not being limited thereto.

Figure 2:
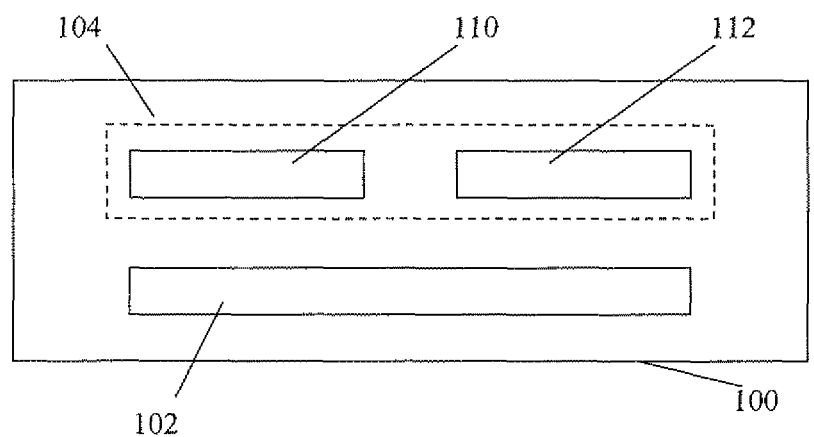
FIG. 2 is a schematic representation of part of a sensor unit for measuring characteristics of individual sub-images using a spatially distinctive detection based on an optical property of the radiation used, according to an embodiment of the first aspect of the present invention.

In a first particular embodiment, the sensor unit is adapted for spatially distinctive detection of a signal comprising information related to or radiation used for the displaying of at least first sub-images and second sub-images based on a property of the radiation used for selectively providing sub-images to the different eyes or views of a user. Such a sensor unit is shown in FIG. 2.

The sensor unit 100 may for example comprise a filter 104 comprising a first filter 110 for filtering radiation having a first radiation characteristic for displaying the first type of sub-images so as to maintain only this radiation or part thereof, i.e. maintaining the radiation having the first radiation characteristics. The filter 104 also may comprise a second filter 112 for filtering radiation having a second radiation characteristic for displaying the second type of sub-images so as to maintain only this radiation or part thereof, i.e. maintaining only the radiation having the second radiation characteristics. The detector 102 may be aligned with the filter 104 and may be adapted to spatially distinctive detection of the radiation having a first radiation characteristic and the radiation having a second radiation characteristic. More in general, the detector 102 may be adapted to spatially distinctive detect the different types of radiation used for imaging the different types of sub-images. The detector 102, may e.g. be a line or array detector or may be a set of separate detector elements, each adapted for detecting the filtered radiation. The radiation characteristic used for filtering depends and may correspond or at least partly overlap with the radiation characteristics used for generating the different sub-images for the different eyes or views.

Figure 3A:
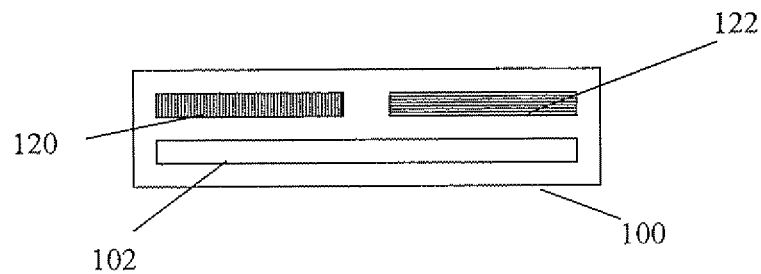
FIG. 3a, FIG. 3b and FIG. 3c is a sensory unit for measuring characteristics of individual sub-images generated in a polarisation-based three-dimensional stereoscopic display system according to embodiments of the first aspect of the present invention.
Figure 3B:
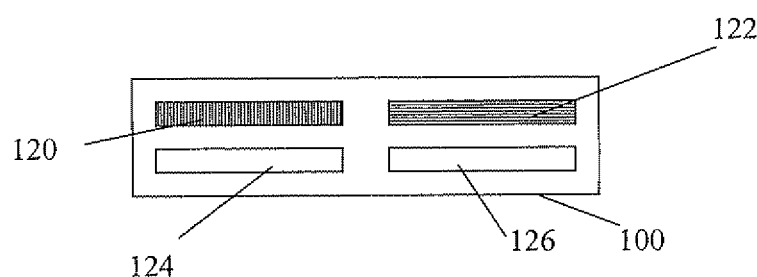
Figure 3C:
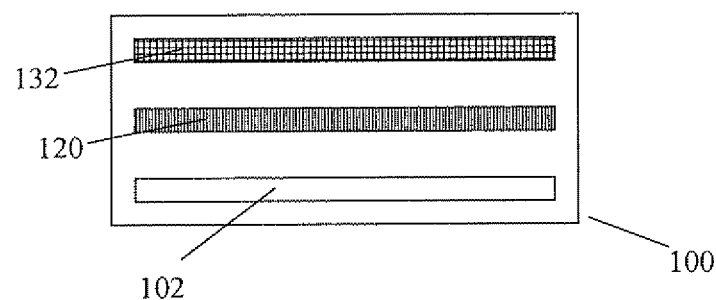

In one particular example, polarisation is used to distinguish between radiation for the different sub-images in the display system and thus also in a sensor unit. The filter 104 then may comprise a first polarisation filter 120 selecting radiation having a first polarisation state and a second polarisation filter 122 selecting radiation having a second polarisation state, different from the first polarisation state. The polarisation states used thereby correspond with the polarisation states used for providing the different sub-images to the different eyes or views separately. Such filter 104 may comprise polarisation selective filters such as polarisation selectors or wire-grid polarisers, etc. Different polarisation states that may be used for distinguishing may be for example vertical polarisation and horizontal polarisation, left circular polarisation and right circular polarisation, etc. Such system with a detector array or with separate detector elements are illustrated respectively in FIG. 3a and FIG. 3b. Whereas FIG. 3a illustrates the use of a single detector array 102 spatially distinctive detecting the different sub-images, in FIG. 3b the use of a plurality of sub-detectors 124, 126 is shown each whereby e.g. each sub-detector is adapted for detecting a sub-image. In FIG. 3c an alternative example is shown, wherein additionally a polarisation altering element 132, such as a liquid crystal cell or pixels of a liquid crystal display or a switchable, is used to adjust the polarisation such that in combination with a single polarisation selective filter 120, radiation of different types can be selectively detected. For example, radiation with polarisation of a first type, may be detected when the polariser cell or liquid crystal display are in an OFF state, thus transmitting the radiation of the first type to the detector. The latter allows detection of sub-images displayed with radiation having the first type of polarisation. When the polarisation altering element 132 is used, the first polarisation type is switch to the second polarisation type, such that corresponding radiation is not transmitted by the polarisation selective filter 120 thus not allowing detection of the first sub-images, but the second polarisation type is switched to the first polarisation type such that corresponding radiation is transmitted by the polarisation selective filter 120 thus allowing detection of the second sub-images. By switching the polarisation altering element 132 on and off, selectively first and second sub-images can be detected. The sensor unit shown in FIG. 3c uses a property of the radiation used for selectively providing the sub-images to the different eyes, but differs from FIG. 2 and FIGS. 3a and 3b in that detection is not spatially distinct but temporally distinct.

Figure 4A:
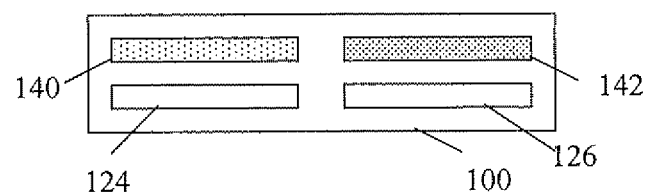
FIG. 4a and FIG. 4b illustrate a sensory unit for measuring characteristics of individual sub-images generated in a colour-based three-dimensional stereoscopic display system according to a particular example of a first embodiment of the first aspect of the present invention.
Figure 4B:
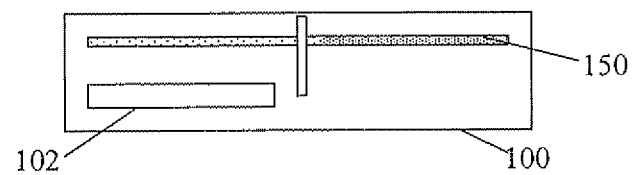
Figure 5:
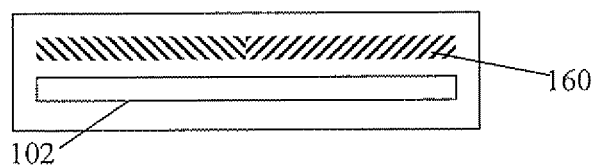
FIG. 5 is a sensory unit for measuring characteristics of individual sub-images using a directional three-dimensional stereoscopic display system according to a particular example of a first embodiment of the first aspect of the present invention.

In another particular example, colour is used to distinguish between the radiation used for different sub-images in the sensor unit. The filter 104 then may comprise a first colour filter 140 selecting radiation having a first wavelength or within a first wavelength range and a second colour filter 142 filtering radiation having a second wavelength or within a second wavelength range, distinct from the first wavelength or wavelength range. The colour filters used thereby correspond with the colour of the radiation used for providing the different sub-images to the different eyes or views separately by the display system. In FIG. 4a and FIG. 4b, a schematic representation of part of a sensor unit 100 is shown. In FIG. 4a a system is shown wherein the different coloured radiation is spatially distinctive detected using a first colour filter 140 for filtering the radiation with which a first type of sub-images is made and a second colour filter 142 for filtering the radiation with which a second type of sub-images is made. The colour filters also may be referred to as spectral filters. The detector 102 is shown as a plurality of sub-detectors 124, 126, but alternatively also may comprise a single array detector. By way of example, in FIG. 4b, a system is shown wherein the different colour filters are provided only temporally in the light path, thus sequentially, instead of spatially distinctive, detecting radiation used for imaging the first sub-image and radiation used for imaging the second sub-image. The system thereby uses a temporal colour filter 150, such as for example a colour filter wheel or colour filter strip providing different filters at different moments in time in the light path. An advantage of such embodiments may be that the required detection surface may be smaller. Similarly hereto, the present example could also be applied when polarisation is used as radiation characteristic for providing different sub-images to different eyes, whereby the temporal colour filter then is replaced by a temporal polarisation filter.

In a third particular example, a spatial distinctive selection of radiation for first sub-images and second sub-images may be based on selecting radiation depending on the emission angle or range of emission angles of the radiation for first sub-images and the radiation for second sub-images. Such techniques may for example be used with a directional three dimensional display is used, such as e.g. a lenticular three dimensional display system. A schematic representation of such a system is shown by way of example, the present invention not being limited thereto, in FIG. 5. Radiation with a predetermined radiation emission angle or radiation emission angle range may be selected by providing a directional filter 160 or a combination of such filters. In the example shown in FIG. 5, one part of the directional filter 160 may be adapted for receiving radiation emitted under a first emission angle or in a first emission angle range, whereas another part of the directional filter 160 may be adapted for receiving radiation emitted under a second emission angle or in a second emission angle range. These angles are selected to correspond with the emission angles used for selectively providing first sub-images to a first eye or view and selectively providing second sub-images to a second eye or view, thus allowing to obtain information about the displaying of first sub-images separately from information about the displaying of second sub-images.

Figure 6:
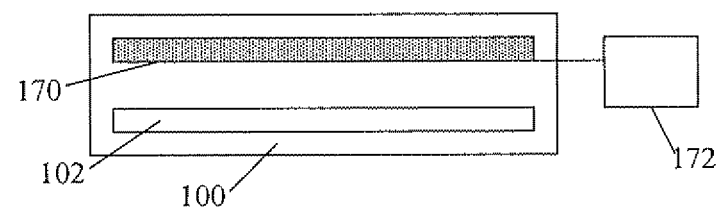
FIG. 6 is a sensory unit for measuring characteristics of individual sub-images generated in a time sequential three-dimensional stereoscopic display system using a shutter according to a second embodiment of the first aspect of the present invention.

In a second embodiment, the present invention relates to a sensor unit adapted for temporally distinctive filtering of at least first sub-images and second sub-images. Such a sensor unit may comprise any of the features and advantages as described above, but it comprises a temporal filter or a shutter for temporally distinctive filtering of the signals comprising information of the displaying of at least first sub-images and information of the displaying of the second sub-images. By way of example, the present invention not being limited thereto, a sensor unit 100 with a shutter 170 is shown in FIG. 6. The shutter 170 thereby may be synchronised with time-sequential displaying of a given type of sub-image so that only information about the displaying of the given type of sub-image is received. By driving the shutter such that such information collection can be done for the different sub-images, the required information can be obtained. The shutter may be synchronised with the provision of different sub-images by the display system using a controller 172. The shutter may be any suitable shutter, such as for example a display whereby a number of pixels is used to block or transmit the radiation, depending on ON or OFF driving of the pixels. Alternatively a temporal filter can be used filtering the incoming radiation such that in one time period a signal comprising information about the displaying of one sub-image is detected, whereas in another time period information about the displaying of another type of sub-images is detected. Such example is already shown by way of example in FIG. 3c and FIG. 4b.

Figure 7:
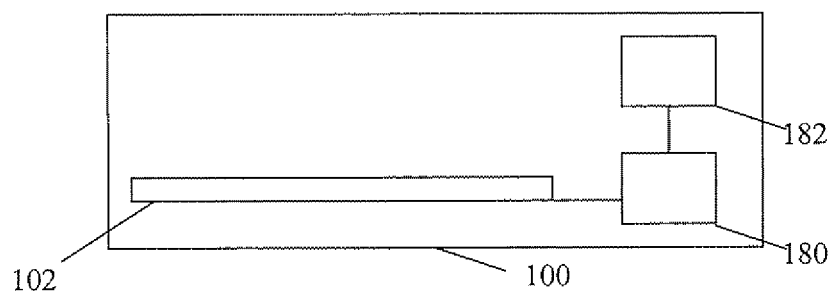
FIG. 7 shows a sensory unit based on a conventional detector and a synchronisation system according to a third embodiment of the first aspect of the present invention.

In a third embodiment, the present invention relates to a sensor unit for obtaining information regarding the displaying of first sub-images and second sub-images independently, whereby the sensor used is a conventional detector as may be used for checking the display properties in a 2-dimensional display system but whereby the read-out frequency of the detected radiation information is adapted to the displaying of the individual sub-images, such that individual information regarding the displaying of the sub-images can be obtained. The sensor unit therefore may comprise or be connected to a sensor driver for driving the sensor unit such as to obtain a plurality of sampled read-outs being representative of only display properties of first sub-images or only display properties of second sub-images. The sensor unit may therefore comprise or be connected to a synchronizer for synchronising the driver with the driving of the display system. By way of illustration, the present invention not being limited thereto, an example sensor unit 100, indicating a detector 102, a driving unit 180 and a synchronising unit 182 is shown in FIG. 7.

Figure 8:
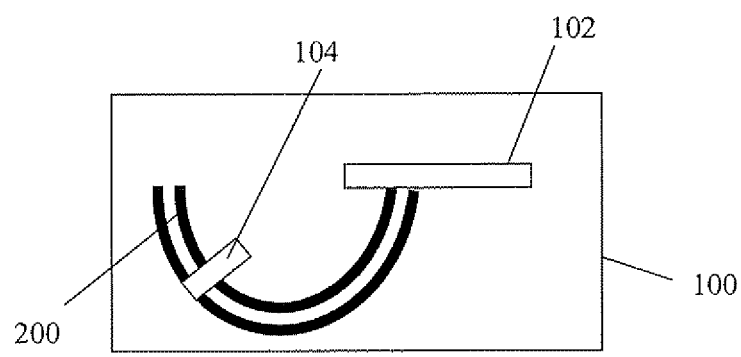
FIG. 8 shows a sensor unit with a light guide according to a fourth embodiment of the first aspect of the present invention.

In a fourth embodiment, the present invention relates to a sensor unit, as described above or in any of the embodiments or examples, whereby the sensor unit comprises a light guide for guiding radiation captured from the display system to the detector. Such a light guide may be any suitable means such as for example an optical fiber, a waveguide, etc. The light guide may be adapted in position and/or shape so as to substantially limit or even avoid stray light to be incident on the detector. The light guide may be the only part being positioned in the viewing field of the display system and may be adapted for guiding the captured light to a detector guided outside the viewing field of the detector. The latter is advantageous as it avoids that the complete sensor unit is to be positioned in front of the display system, which may result in a disturbing effect for the viewer, e.g. blocking a larger portion of the display system. Any of the filter mechanisms as described above, for example in the embodiments or examples, such as e.g. a shutter, a spatial filter, a temporal filter, a color filter, a polarisation selector, a polariser, etc. may be positioned in the light guide, thus resulting in a compact sensory unit. Such filters, shutters or blocking means may be positioned at the entrance or inside the light guide. Alternatively or in addition thereto, depending on the separation technique used, the orientation of the receiving opening of the light guide may be adapted so as to be able to guide light having particular directions to the detector while avoiding light having other particular directions to reach the detector. The latter is illustrated in FIG. 8, indicating the sensor unit 100 with light guide 200 with filter means 104 incorporated in the light guide 200.

Figure 9:
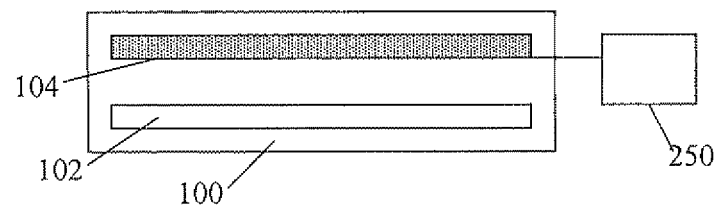
FIG. 9 shows a sensor unit for detecting cross talk in different channels of a three-dimensional image system according to a fifth embodiment of the first aspect of the present invention.

In a fifth embodiment, the present invention relates to a sensor unit as described above, using a filtering technology for obtaining individual information regarding the displaying of different sub-images as described above and in agreement with the filtering technology of the display system, whereby the sensor unit furthermore is adapted for determining cross-talk. The sensor unit may comprise a controller adapted for controlling the sensor unit so as to measure cross talk. The controller thereby may control the sensor unit to detect a signal using a first filter for selecting radiation from the displaying of first sub-images when only second sub-images are displayed by the display system. Whereas in a system without cross-talk no signal should be detected, the actual detection of a signal is indicative of the cross-taik occurring in the display system and/or sensory unit. This information can be used for calibrating the sensory unit and/or the display system. For performing such measurements, the sensor controller may comprise a connection to the display system and provide control commands in agreement with a timing of the display system, when time sequential images are generated, or provide control commands to the display system, e.g. to display only second-sub-mages, for example when the display system provides the different sub-images simultaneously. By way of illustration, the present invention not being limited thereto, a sensor unit 100 is shown in FIG. 9 comprising a detector 102, a filter 104, and a controller 250.

Figure 10A:
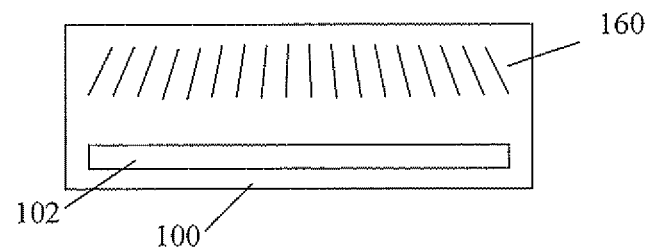
FIG. 10a to FIG. 10c shows sensory units for measuring angular emission patterns of a three-dimensional image system according to the sixth embodiment of the first aspect of the present invention.
Figure 10B:
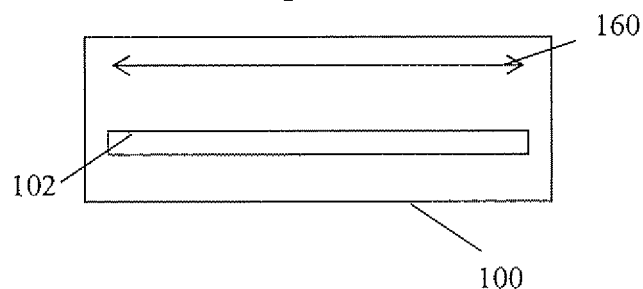
Figure 10C:
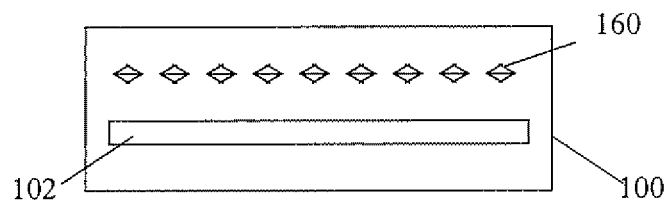

In a sixth embodiment, a sensor unit as described above is provided, whereby the sensor unit is adapted for determining angular emission patterns. The sensor unit therefore may comprise a multi-directional filter for detecting an angular emission pattern. Such a filter may provide a spatial distribution of radiation emitted, i.e. the spatial position on the filter where the radiation is transmitted depends on the emission angle of the received radiation. By way of illustration, the invention not limited thereto, a number of examples of sensor unit parts are shown in FIG. 10a to FIG. 10c indicating different multi-directional filters 160. FIG. 10a indicates a wire grid or barrier filter wherein the filter comprises a plurality of vias for passing the light, the vias having different directions spatially distributed over the filter and therefore being adapted for receiving light having different emission angles. FIG. 10b illustrates a multi-directional filter being a fourier lens and FIG. 10c illustrates a multi-directional filter being a set of different lenses with different acceptance angle.

In a seventh embodiment, a sensor unit is adapted for detecting a signal comprising information regarding the modulation transfer functions. The modulation transfer function (MTF) corresponds to the spatial frequency response of an imaging system or a component. It is the contrast at a given spatial frequency relative to low frequencies. Spatial frequency thereby may be measured in cycles or line pairs per millimeter. For relatively fixed formats, line pairs per millimeter may be more appropriate, whereas for varying formats cycles per pixel or line widths per picture height may be more appropriate. It is to be noticed that high spatial frequencies correspond to fine image detail. The more extended the response is, the finer the detail and thus the sharper the image. The essential meaning of MTF can be seen as follows. Suppose you have a pattern consisting of a pure tone. At frequencies where the MTF of an imaging system or a component (film, lens, etc.) is 100%, the pattern is unattenuated—it retains full contrast. At the frequency where MTF is 50%, the contrast half its original value, and so on. MTF is usually normalized to 100% at very low frequencies. The sensor unit for measuring signals comprising information related to MTF may be adapted for sending different sub-images separately to a lens that magnifies and projects it to a detector, e.g. a CCD. The sensor unit further may comprise a controller for displaying images on the 3D display system wherein depth changes are introduced, e.g. a bar that changes depth. Based on the response in the detector, the three dimensional MTF can be measured. The sensor unit may be adapted for determining MTF in-plane, i.e. in a conventional x and y direction.

The MTF then may be obtained by the sensor measuring the radiation pattern that corresponds to a certain spatial pattern shown on the display and processing the obtained image. The sensor thus will acquire a one-dimensional image, e.g. of a dirac function (either a horizontal or vertical line may be imaged) or a two-dimensional image (whereby both a horizontal and vertical stimulus will be imaged). The MTF then is obtained by taking the Fourier transform of this image possibly followed by additional processing. In one particular embodiment, the sensor furthermore is adapted for obtaining information regarding the MTF in the depth direction, i.e. the third dimension. For the MTF in the third dimension of the 3D display the disparity that can be achieved between first and second sub-images is to be measured. As a next step this disparity between two images is translated into a 3D image that represents is how the human eye would perceive the depth. Based on the 3D image, the Fourier transform of the depth axis of the 3D image can be determined which represents the MTF in the depth dimension. The sensor unit may comprise or be in connection with a processor having the functionality of the steps for measuring MTF in the depth and/or other directions as described above.

In an eighth embodiment, a sensor unit is provided adapted for detecting a signal comprising information related to flicker. The latter may be performed using any of the above filters and using a detector that has a low time constant, such as for example a low time constant photodiode. Flicker may be determined for the individual sub-images and the effect on the three-dimensional flicker may be derived.

In a ninth embodiment, the sensor unit comprises or is adapted to receive input from a detection system for detecting a viewer, such as e.g. an eye-tracker. The generated information regarding the viewer may be used for measuring the particular sub-images to be used for providing a three-dimensional image to the particular user. In other words, selection of the sub-images detected and/or used for deriving further information may be based on a particular position of a viewer. In a related embodiment, the sensor unit may be adapted for detecting and/or using only information regarding the displaying of some of the different types of sub-images generated. In such an embodiment, some views thus may be selected for use for the controlling, adjusting or calibrating of the display system or obtaining information regarding the display system, while information regarding other views may either not be derived or may be derived based on information obtained for other views, e.g. by interpolation.

In a second aspect, the present invention also relates to a display system for generating three-dimensional images. According to the present aspect of the invention, the display system comprises a sensor unit as described above. The display system furthermore advantageously comprises a display adapted for generating three-dimensional images by providing first sub-images to a first eye and second sub-images to a second eye. The display system also advantageously comprises a controller for controlling the display. The display system may comprise, optionally as part of the sensor unit, a processor for processing obtained deriving display properties regarding the displaying of sub-images individually. This processing further may comprise generating calibration, adjustment or control information. The system may further comprise the same features and advantages as set out in the first aspect.

In a third aspect, the present invention relates to a method for deriving display properties of a display system for generating three-dimensional images by combining at least first sub-images for a first eye and second sub-images for a second eye. The method thereby comprises detecting a signal comprising information related to or radiation properties of radiation used for the displaying of the first sub-images and detecting a signal comprising information related to radiation properties of the radiation used for the displaying of said second sub-images individually. The method thereby may comprise filtering the radiation used for displaying a predetermined type of sub-images, e.g. by filtering radiation with a particular wavelength or wavelength wave, filtering radiation with a particular polarisation state, filtering radiation emitted under a predetermined emission angle or within a predetermined emission range, etc. The method may comprise selectively filtering between radiation used for displaying first sub-images and radiation used for displaying second sub-images. More generally, the method comprises selectively filtering radiation used for the different types of sub-images generated. The method further comprises deriving display properties of the displaying of the individual sub-images based on the detected radiation. The method furthermore may comprise detecting radiation used for a number of different types of sub-images intended to be viewed by first views, while using this information for deriving information regarding the displaying of other types of sub-images intended to be detected by other views. The method also may comprise synchronising sensing of radiation properties of the radiation used for the displaying of predetermined sub-images with the displaying of these predetermined sub-images. The method also may comprise controlling a temporal filter in agreement with the displaying of the different types of sub-images. In one aspect, the present invention furthermore relates to a method for calibrating or controlling a display system for generating three-dimensional images by combining at least first sub-images for a first eye or view and second sub-images for a second eye or view. The method comprises deriving display properties of a display system as described above, and using this information for adjusting or controlling the displaying of the first sub-image and the displaying of the second sub-image. Such adjustment or control may comprise adjusting the driving of the display system such as e.g. adjusting the brightness.

In a fourth aspect, the present invention also relates to a controller for use with a sensor unit for a display system adapted for generating three dimensional images by combining at least first sub-images for a first eye and a second sub-images for a second eye. Such a controller may be adapted for generating control signals for driving the sensor unit in synchronisation with the display system. Such synchronisation may be a predetermined correlation between the read-out timing of the sensor unit and the display timing of the different types of sub-images. It may e.g. control the sensor unit such that, in combination with an appropriate filter, the sensor unit is controlled for detecting radiation used for displaying the first sub-images when the display system is displaying said first sub-images and the sensor unit is controlled for detecting radiation used for displaying the second sub-images when the display system is displaying said second sub-images. In some embodiments, the controller may be adapted for altering the synchronisation, e.g. when cross-talk is to be detected. The controller furthermore may be adapted for generating particular test images or sub-images to be produced by the display system. The controller alternatively or in addition to the above can be adapted for providing the functionality described for any of the controllers in the embodiments or to examples above. The controller may include a computing device, e.g. microprocessor, for instance it may be a micro-controller. In particular, it may include a programmable controller, for instance a programmable digital logic device such as a Programmable Array Logic (PAL), a Programmable Logic Array, a Programmable Gate Array, especially a Field Programmable Gate Array (FPGA). The use of an FPGA allows subsequent programming, e.g. by downloading the required settings of the FPGA.

It is to be understood that although preferred embodiments, specific constructions and configurations, as well as materials, have been discussed herein for devices according to the present invention, various changes or modifications in form and detail may be made without departing from the scope and spirit of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A sensor unit for sensing characteristics of a display system when used for imaging, the display system being configured to generate three dimensional images by combining at least first sub-images for a first eye and second sub-images for a second eye, the sensor unit comprising:
   a filter configured to filter radiation used for displaying of said first sub-images from radiation used for the displaying of said second sub-images;
   a detector configured to detect a first radiation signal comprising information related to separate properties of the radiation used by the display system for the displaying of said first sub-images and/or to detect a second radiation signal comprising information related to separate properties of the radiation used by the display system for the displaying of said second sub-images individually, and
   a processor configured to process detected signals from the detector and to generate control signals based thereon for adjusting the characteristics of the display system which characteristics are used when imaging the first sub-images and/or control signals adjusting the characteristics of the display system which characteristics are used when imaging the second sub-images.

2. A sensor unit according to claim 1, wherein said filter is a temporal filter configured to alter the detected radiation by alternatingly providing different filter portions with a different filter characteristic in a light path to a detector of the sensor unit.

3. A sensor unit according to claim 2, wherein the sensor unit comprises a shutter for generating said temporal filter.

4. A sensor unit according to claim 1, wherein the detector has a first detector part and a second detector part and wherein the filter comprises a spatial filter configured to spatially filter radiation for the displaying of said first sub-images substantially only to said first detector part.

5. A sensor unit according to claim 4, wherein said filter is configured to filter radiation having a first color and/or first polarisation state and/or first emission angle range to a first detector part only and filters light having a second color and/or second polarisation and/or second emission angle range to a second detector part only.

6. A sensor unit according to claim 5, wherein the filter comprises a polarizer or liquid crystal display for selecting radiation with a predetermined polarisation state, a spectral filter for selecting radiation with a predetermined wavelength or within a predetermined wavelength range or a barrier or Fourier lens for selecting light emitted under predetermined emission angles or predetermined emission angle ranges.

7. A sensor unit according to claim 1, the sensor unit comprising a radiation guide configured to guide light to the detector.

8. A sensor unit according to claim 7, wherein said filter is provided in said radiation guide.

9. A sensor unit according to claim 1, wherein said sensor unit comprises a driver configured to drive said sensor unit to obtain a plurality of sampled read-outs that are representative of only radiation for the displaying of first sub-images or only radiation for the displaying of second sub-images.

10. A sensor unit according to claim 9, wherein the sensor unit comprises a synchronizer adapted to synchronize said driver with driving of said display system.

11. A sensor unit according to claim 1, wherein the sensor unit is configured to determine one of cross-talk, angular emission patterns, modulation transfer functions, flicker or a display property of the displaying of first sub-images or second sub-images individually.

12. A sensor unit according to claim 11, wherein the sensor unit is configured to determine one of cross-talk, angular emission patterns, modulation transfer functions, flicker or a display property of the displaying of first sub-images or second sub-images individually in real time.

13. A sensor unit according to claim 1, wherein the sensor unit is configured to determine a luminance and/or color point of the displaying of first sub-images or the displaying of second sub-images individually.

14. A sensor unit according to claim 13, wherein the determining is performable in real time.

15. A sensor unit according to claim 1, wherein the processor is arranged to process detected signals comprising information related to radiation used for displaying said first sub-images thus deriving individual display characteristics for the displaying of first sub-images and/or for processing detected radiation signals of radiation used for displaying said second sub-images thus deriving individual display characteristics for the displaying of first sub-images.

16. A sensor unit according to claim 15, wherein said processor is configured to apply a human visual model using said individual display characteristics for displaying said first sub-images and said individual display characteristics for displaying said second sub-images as input.

17. A sensor unit according to claim 16, wherein said processor is configured to process said individual display characteristics for displaying said first sub-images as a function of said individual display characteristics for displaying said second sub-images.

18. A sensor unit according to claim 15, wherein the processor is configured to determine calibration information for said display system based on said processing.

19. A sensor unit according to claim 18, wherein the processor is configured to determine said calibration information in agreement with a predetermined standard.

20. A sensor unit according to claim 19, wherein said predetermined standard is the DICOM GSDF standard.

21. A sensor unit according to claim 1, wherein the derived radiation characteristics of the displaying comprise any of a brightness, a spectrum, an average color point, an average emission angle, a maximum luminance, an average luminance, a minimum luminance, a contrast ratio, an average contrast ratio, a response time between specific greyscale transitions or an average response time.

22. A display system for generating three-dimensional images, the display system comprising a sensor unit according to claim 1.

23. A method for deriving display characteristics of a display system when used for imaging and for generating three-dimensional images by combining at least first sub-images for a first eye and second sub-images for a second eye, the method comprising:
filtering radiation used for displaying of said first sub-images from radiation used for the displaying of said second sub-images;
detecting at least one first radiation signal comprising information related to separate properties of the radiation used by the display system for the displaying of said first sub-images and one second signal comprising information related to separate properties of the radiation characteristics of the radiation used by the display system for the displaying of said second sub-images individually; and
processing detected signals and generating control signals based thereon for adjusting the characteristics of the display system which characteristics are used when imaging first sub-images and/or control signals adjusting the characteristics of the display system which characteristics are used when imaging the second sub-images.

24. A method for calibrating or controlling a display system for generating three-dimensional images by combining at least first sub-images for a first eye and second sub-images for a second eye, the method comprising obtaining display characteristics of a display system using the method recited in claim 23, the method for calibrating or controlling further comprising using said detected display characteristics to adjust or control the displaying of the first sub-image and the displaying of the second sub-image.

25. A sensor unit according to claim 1, wherein the detector is configured to detect radiation used for displaying of the first sub-images, filtered from the radiation used for the displaying of the second sub-images as the signal comprising information related to separate characteristics of the radiation used for the displaying of the first sub-images and the detector is configured to detect radiation used for displaying of the second sub-images, filtered from the radiation used for the displaying of the first sub-images as the signal comprising information related to separate characteristics of the radiation used for the displaying of the second sub-images.

* * * * *